May 7, 1963 D. E. FRANZEN 3,088,609
HARVESTING MACHINE
Filed March 24, 1959 4 Sheets-Sheet 1

INVENTOR
DONALD E. FRANZEN

BY *Edward M. Farrell*
ATTORNEY

May 7, 1963     D. E. FRANZEN     3,088,609
HARVESTING MACHINE

Filed March 24, 1959     4 Sheets-Sheet 2

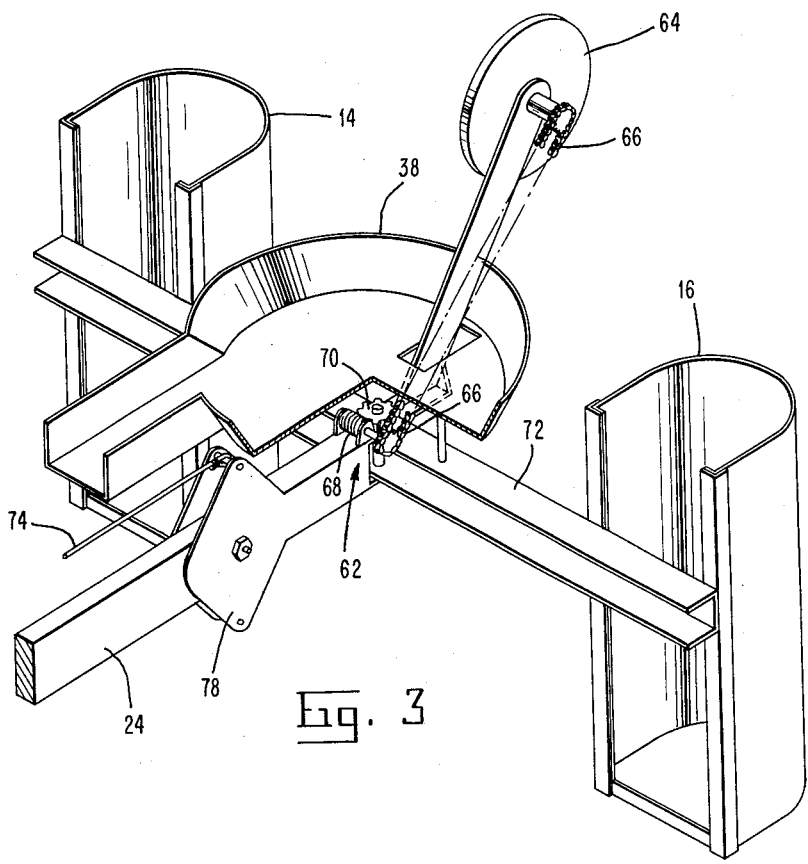
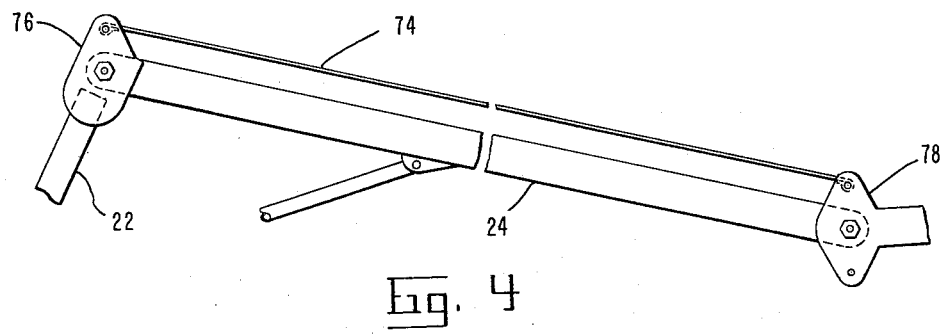

May 7, 1963  D. E. FRANZEN  3,088,609
HARVESTING MACHINE
Filed March 24, 1959  4 Sheets-Sheet 4
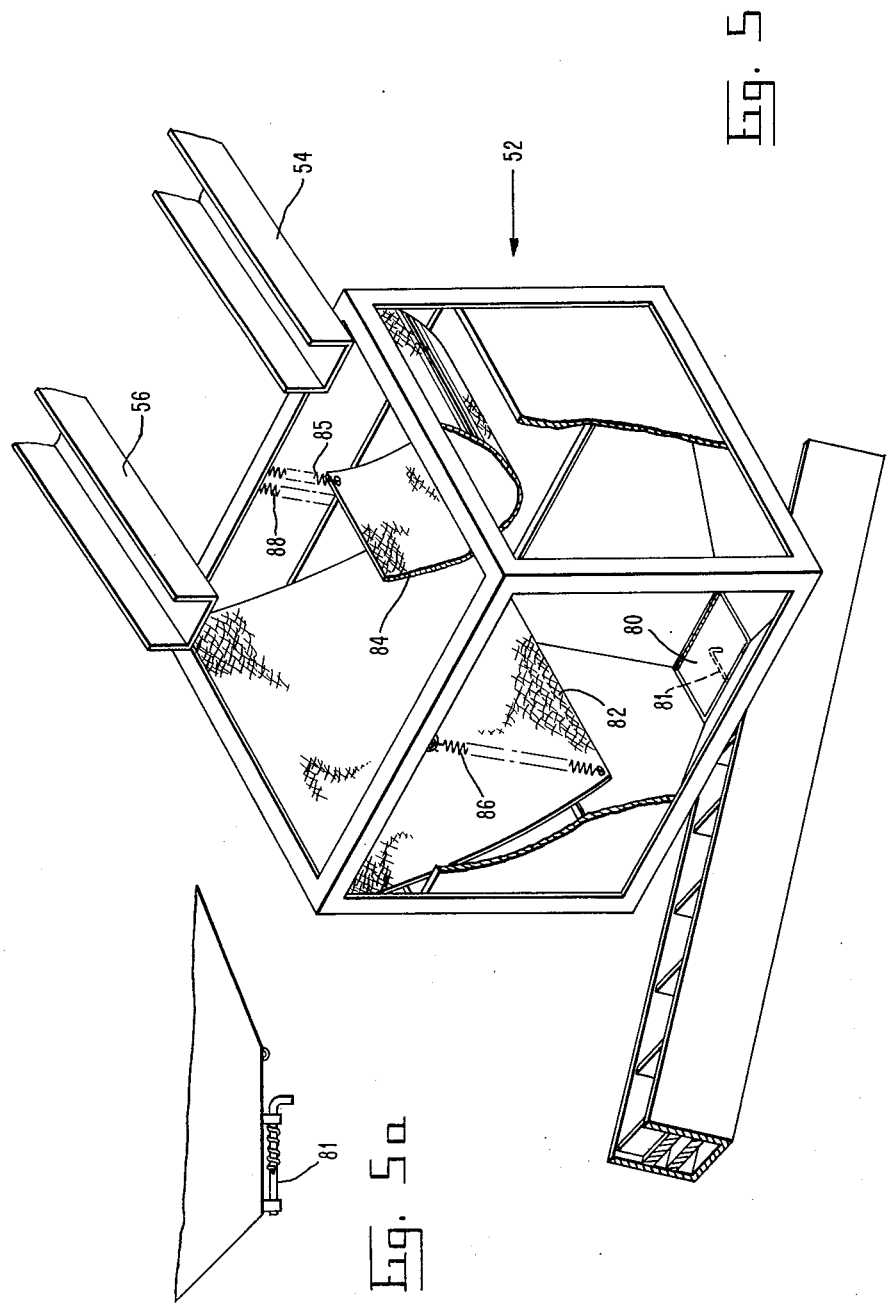

United States Patent Office 3,088,609
Patented May 7, 1963

3,088,609
HARVESTING MACHINE
Donald E. Franzen, Monroeville, N.J., assignor to Franzen Corporation, a corporation of New Jersey
Filed Mar. 24, 1959, Ser. No. 801,646
4 Claims. (Cl. 214—83.1)

This invention relates to harvesting machines and, more particularly, to harvesting machines for use in orchards.

Heretofore, various types of machines have been employed for facilitating pruning and crop picking operations in orchards. Such machines have been primarily aimed at minimizing the loss of time and effort in such operations. The necessity of moving heavy and cumbersome ladders through an orchard by workers during picking operations has been eliminated by many such machines.

Some machines for use in orchards during the picking season have been provided which are portable and include elevated platforms for supporting workers. Many such platforms have been power actuated and shiftable vertically, horizontally and angularly relative to adjacent trees. These platforms, while satisfactory in most respects, have often been of shapes and sizes which have made them susceptible to catching in branches. Because of this, breaking of branches and permanent damage to the trees often results.

While in many cases, the aforementioned machines have included many desirable and adjustable features, they have often been relatively complex and expensive. Because the picking season is of a relatively short duration, such machines, requiring a large initial financial outlay, often remain idle for the greater part of the year. It, therefore, often becomes uneconomical for the average orchard owner to take advantage of such labor and time saving machines.

Despite the complexity and expense involved in many of the harvesting machines used heretofore, they have often included undesirable features, which have required attention by a worker or picker. For example, in many such harvesting machines, a picker's attention is often directed to periodically adjusting his platform, stopping to unload his basket after it has become full and to various other activities not particularly related to the selection and picking of fruit or other crop. Consequently, with his attention constantly being diverted, a picker often tends to pick unripend fruit and does not devote sufficient care to the handling of the picked fruit. It is well-known that much loss results from the picking of unripened and damaged fruit. Much of the damage to fruit is a result of dropping of the fruit too great a distance either immediately after picking or at some time between the actual picking and loading operations.

It is common knowledge in the industry that the harvesting season for fruits, such as apples and oranges, is of relatively short duration. Consequently, it is difficult for orchard owners to be assured of pickers of the necessary skill and experience from season to season. A continuous time-consuming training program for new pickers is often necessary. The inexperience of pickers even after some training, results in improper handling and bruising of the fruit picked. The bruised fruit will often not be discovered at the time of storage, however, it will be discovered when it comes out of storage and results in much loss to the orchard owner.

The size and color of the fruit picked is generally of prime importance in determining its value in the commercial market. If workers or pickers are permitted to devote their entire attention to the consideration of these factors during the picking operation, much damage to the picked fruit may be eliminated. Once ripe fruit is picked, it is desirable that the degree of care required to be exercised by pickers be minimized to assure that no damage results between the picking and loading.

It is an object of this invention to provide an improved fruit picking apparatus in which damage to fruit by careless handling may be minimized.

It is a further object of this invention to provide an improved fruit picking machine in which the cost and complexity involved are minimized.

It is still a further object of this invention to provide an improved crop picking machine which will permit a maximum number of workers to work simultaneously on the same tree.

It is still a further object of this invention to provide an improved crop picking machine having relatively simple automatic levelings and platform positioning elements.

It is still a further object of this invention to provide an improved fruit picking machine having adjustable platforms which will not tend to damage branches of trees during picking operations.

In accordance with the present invention, an adjustable harvesting or fruit picking machine is provided for minimizing damage to trees and fruit from the time of picking to the time of loading. A plurality of booms, adjustable horizontally, vertically and angularly, each include a plurality of platforms for carrying workers. Means for positioning and automatically leveling the platforms are provided. A conveyor, disposed adjacent a fruit receiving receptacle, is provided to carry the picked fruit to a special storage bin. The fruit may be loaded directly from the bin or a second conveyor may be employed to carry the stored fruit from the bin to a loading device.

Other objects and advantages of the present invention will be apparent and suggest themselves to those skilled in the art, from a reading of the following specification and claims, in conjunction with the accompanying drawing, in which:

FIGURE 3 is an enlarged view of a pair of platforms included in the harvesting machine illustrated in FIGURES 1 and 2;

FIGURE 4 is an enlarged view illustrating an automatic leveling mechanism in two positions, as illustrated in FIGURE 1;

FIGURE 5 is an enlarged detailed view of a storage bin illustrated in FIGURES 1 and 2; and FIGURE 5a illustrates an enlarged detail view of latch mechanism of FIGURE 5.

Figure 1:
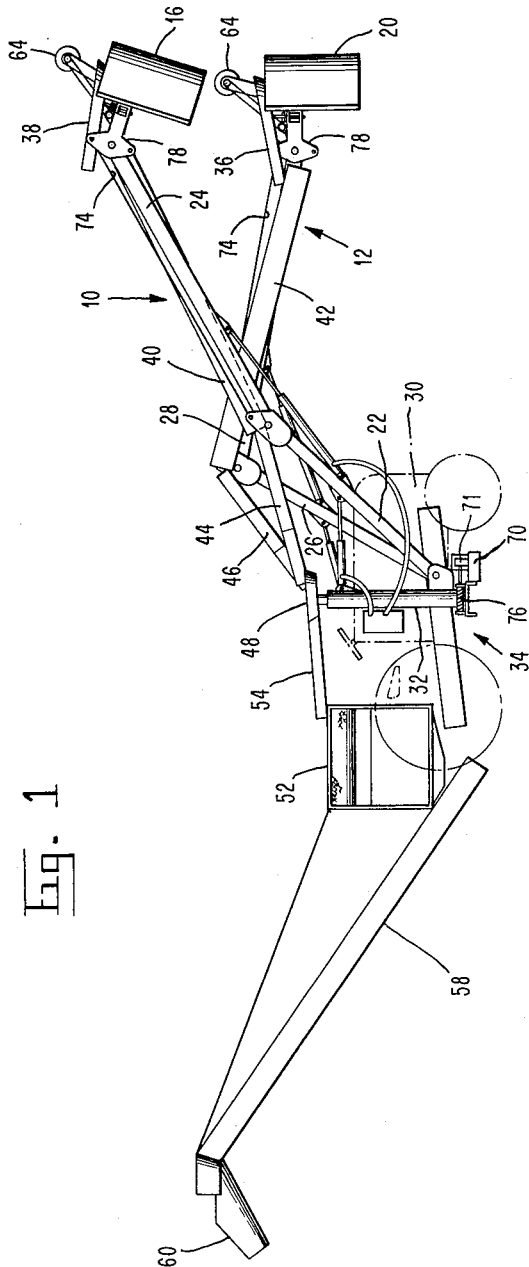
FIGURE 1 is a side elevational view illustrating an adjustable harvesting machine, in accordance with the present invention.
Figure 2:
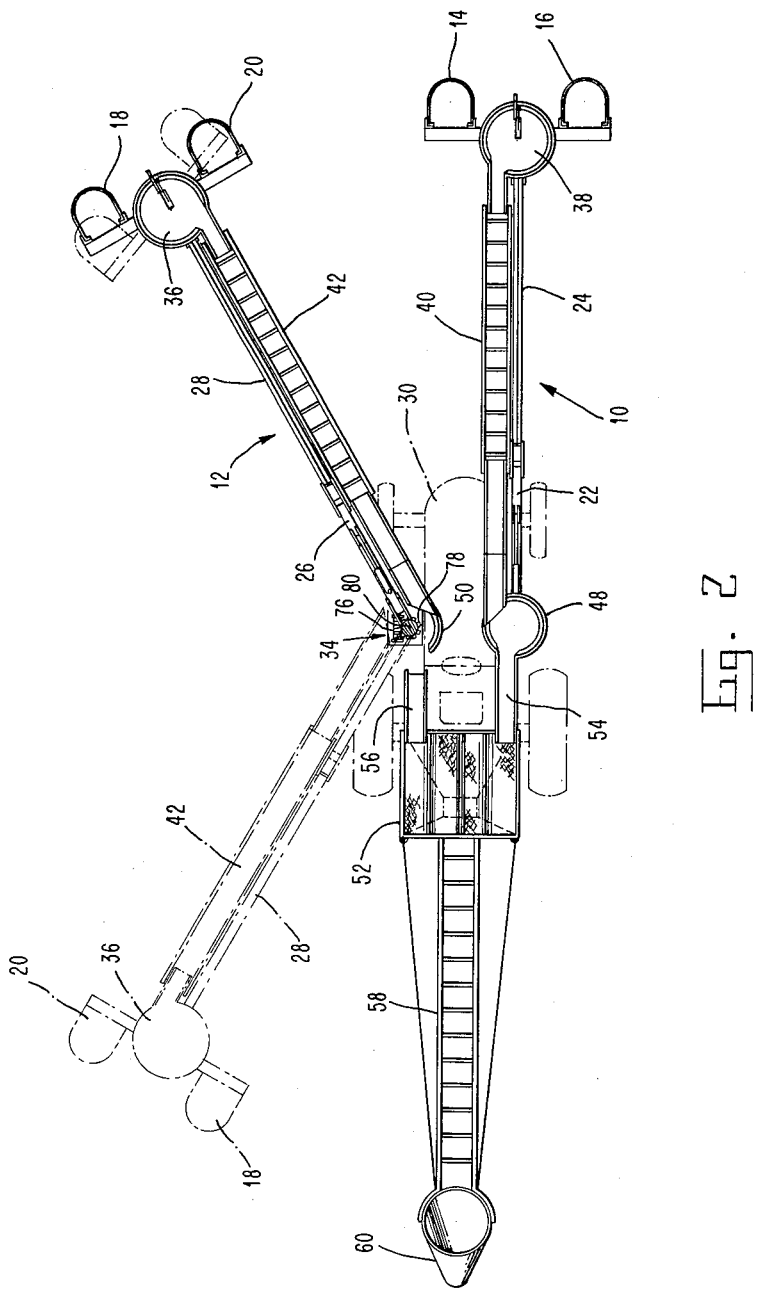
FIGURE 2 is a top view, of the harvesting machine illustrated in FIGURE 1, with some of the elements thereof being disposed in slightly different positions.

Referring particularly to FIGURES 1 and 2, a harvesting or fruit picking machine or apparatus includes a pair of adjustable booms 10 and 12. The boom 10 includes a pair of perches or platforms 14 and 16 mechanically attached to its free end. The boom 12 likewise includes a pair of perches or platforms 18 and 20.

The boom 10 includes a pair of hydraulically driven sections 26 and 28, which are adjustable to carry the platforms 18 and 20 to different horizontal and vertical positions.

The booms 10 and 12 are hydraulically operated from a source of power provided by a tractor 30. The tractor 30 may be of the conventional type having a gasoline engine in operative engagement with a constant speed gear pump. The pump may supply a constant volume of pressure fluid to operate hydraulic motors for moving the booms 10 and 12. The speed of the engine operating the pump may be governed to cause the pump to deliver a constant level of fluid whereby an instantaneous actuation of the booms 10 and 12 may be effected. Each of the sections 22, 24, 26 and 28 include hydraulic members having piston rods. Flexible hoses connect the hydraulic members to a fluid reservoir on the tractor 30. Various controls may be included on the tractor 30 to control valves to operate the hydraulic members and consequently the booms 10 and 12.

The boom 10 is physically fixed to a central member 32. The boom 12 is fixed in a similar manner to the boom 10 and, therefore, its arrangement is not shown specifically or described in detail. The member 32 may be mechanically turned by a gearing mechanism 34 to move the boom 10 through different angular positions around the tractor 30. In this respect, the member 32 and the gearing mechanism 34 may be considered a form of turntable arrangement. The boom 10 is adapted to be moved through an angle of approximately 180 degrees. The gearing mechanism 34 may be motor driven and controlled by an operator in the tractor 30. The gearing mechanism 34 includes a hydraulic motor 70 connected through a gear box 72 to rotate a worm gear 76 to turn the gear 78. When the gear 78 is rotated, a shaft member 80 to which the boom is connected is rotated.

In picking fruit in an orchard, the tractor 30, which may be considered a movable base member, may be moved in a path between two rows of trees from which fruit is to be picked, with the booms 10 and 12 being positioned to pick from both rows of trees simultaneously. Workers or pickers may position themselves on the platforms when the platforms are close to the ground when the booms 10 and 12 are in lowered positions. The pickers are lifted by the platforms 14, 16, 18 and 20 to convenient positions adjacent the trees to permit manual picking of the fruit or crop from the trees. The horizontal and vertical positions of the platforms are controlled by the operation of the hydraulic mechanisms attached to the sections 22, 24, 26 and 28 of the booms 10 and 12. Pickers may start to pick fruit from the lower portions of trees and gradually be raised by the booms 10 and 12 to the upper portions as the fruit picking operation progresses.

The pickers are moved around the trees as the tractor 30 moves forward and the booms 10 and 12 are angularly moved through an angle of approximately 180 degrees. This arrangement permits approximately one-half of a tree to be picked. The remaining half of the tree may be picked as pickers are moved adjacent the tree on its opposite side, when the tractor 30 is moved down the next path.

Having two platforms at the end of each of the booms 10 and 12 makes it possible for the picking operation to proceed at a relatively fast rate because it permits two pickers to work simultaneously around the same tree area.

It is noted that the platforms 14, 16, 18 and 20 are semi-circular in shape. Being of this shape, the platforms do not include sharp corners in the immediate vicinity of the tree being picked. Consequently, it is possible for the platforms to be moved very close to the tree branches without the danger of the platforms catching in the branches of the tree thereby permanently damaging the tree or causing bruising of the fruit. Moving the platforms close to the tree branches enables a picker to make better visual inspection of the fruit prior to picking as well as enabling him to reach a greater number of fruit.

As will be discussed in connection with FIGURE 3, a relatively simple adjustment of the platforms with respect to the booms may be made to assure that both pickers in the pairs of platforms may be positioned close to the tree during the picking operation.

When the fruit is picked, it may be placed in pans or fruit receiving receptacles 36 and 38. The pan 36 is conveniently disposed between the platforms 18 and 20. The pan 38 is likewise conveniently disposed between the platforms 14 and 16.

When the fruit is placed in the pans or receptacles 36 and 38 by the pickers, it is passed into units which include a pair of endless conveyor belts 40 and 42. The conveyor belts 40 and 42 may be driven by a motor conveniently disposed on the booms 10 and 12.

The fruit picked by the pickers and placed in the pans 36 and 38 is carried by the conveyor belts 40 and 42 to a pair of chutes 44 and 46. The chutes 44 and 46 are disposed at a slightly downward angle to enable the fruit from the conveyor belts to pass to a second pair of pans or receptacles 48 and 50. The pans 48 and 50 are curved or circular in shape and disposed so that the fruit from the chutes 44 and 46 are received at a slight angle to slow down the movement of the fruit to some extent as it is received from the chutes 44 and 46. Slowing down the fruit at this point helps to minimize the possibility of sudden stoppage or physical contact causing the fruit to be bruised or otherwise damaged. The fruit from the pans 48 and 50 are then passed to a storage bin 52 by means of a pair of chutes or guide members 54 and 56 which extend from the pans 48 and 50, respectively.

The bin 52 may include a door or opening at the bottom to periodically permit the fruit stored in the bin 52 to be unloaded into a conveyor 58. The fruit may they be carried by the conveyor 58 to a loading chute 60. Various trucks or loading devices may be moved adjacent the loading chute 60 to receive the fruit therefrom. If desired, the angle of the conveyor 58 may be adjustable to various positions with respect to the ground or the chute 60 may be of variable lengths to accommodate loading devices of different heights.

The storage bin 52 for temporarily storing the picked fruit makes it possible to continue the fruit picking operation between loading periods. Without the storage bin for temporary storage, it would be necessary for pickers to stop picking until successive loading devices are in position to receive the picked fruit. The bin 52 itself is of a special type to prevent the fruit received from the guide members 54 and 56 from dropping too great a distance. These features will be seen more clearly in connection with FIGURE 5.

One of the features of the present invention is that from the time the fruit is picked and put into the pans 36 and 38 until the time it reaches the storage bin 52 or chute 60, no substantial dropping of the fruit from any great height or hard physical contact while the fruit is moving is involved. This arrangement minimizes the possibilities of damage to the fruit during picking operations. This feature is especially susceptible to damage when dropped from even a small height or subjected to heavy contact with other physical objects while moving.

An operator in the tractor 30 may control the various heights and angular positions of the platforms 14, 16, 18 and 20. Consequently, workers in these platforms are free to devote their entire attention to the selection and picking of the fruit. Because pickers do not need to concern themselves to controlling their various positions while picking, the likelihood that only ripe fruit will be picked is greatly enhanced.

Having two platforms at the end of each boom makes it possible for the picking time to be reduced because it enables more than one picker to work simultaneously from one boom.

It is noted that the entire fruit picking assembly involving the present invention may be mechanically attached to a conventional type of tractor which is found on many farms and orchards. Because the attachment may be taken off after the fruit picking season, the tractor may be made available for other chores.

Referring particularly to FIGURE 3, the platforms 14 and 16 are carried by the section 24 of the boom 10, it being understood that a similar arrangement also applies to the platforms 18 and 20 with respect to the boom 12.

The pan 38 is disposed between the platforms 14 and 16, the pan being partly cut away to illustrate the gearing mechanism thereunder. Means for adjusting the angular position of the platforms 14 and 16 with respect to the boom section 24 is provided by a gear mechanism 62. Turning a crank wheel 64 by one of the pickers drives a chain 66 which, in turn, causes a worm gear 68 to be rotated. Rotation of the worm gear 68 turns a wheel gear 70 which is fixedly mounted to a beam 72. The beam 72 is welded or otherwise suitably attached to firmly hold the platforms 14 and 16.

When the beam 72 is moved, the relative positions of the platforms 14 and 16 with respect to the boom section 24 will be changed. This feature makes it possible to adjust the positions of platforms 14 and 16 so that both pickers in the platforms may be close to the tree at the same time. This adjustable feature may be controlled by the operator in the tractor 30, if desired, by adding somewhat to the complexity and expense of the machine. However, because this is an adjustment which need not be made very often, and is made only after changes in the angular position of the booms, the manual adjustment by the pickers does not materially prevent them from devoting their full time and attention to the selection and picking of the fruit involved.

As has been noted, the platforms 14 and 16, being semicircular in shape and free of sharp corners, may be moved very close to the trees without the danger of breaking branches and causing permanent damage.

Referring particularly to FIGURE 4, a relatively simple means for assuring constant leveling of the platform during the picking operation, is illustrated. A cable 74 is tied to a member 76 disposed at the end of the boom section 22. The opposite end of the cable is tied to a member 78 connected to the end of the boom section 24. The member 78 carries the platform 14 and 16. A similar arrangement applies to the platforms 18 and 20 and is not shown in detail. When the boom section 22 is maintained at a fixed position and the boom section 24 is raised or lowered, the member 78 will be maintained in the same vertical position, as is illustrated by the two positions shown. Consequently, the platforms carried by the section 78 will be maintained relatively level at all times during the picking operation.

It is noted that at rare intervals, such as when the fruit is being picked from the top of the tree, it may be desirable to tilt the platform slightly in order to permit pickers to closely approach the top of the tree without the danger of the platforms becoming caught within the tree branches. In these cases, adjustment of the angle or position of the boom section 22 with respect to the ground causes the platforms 14 and 16 to be tilted slightly. The adjustment of the boom section 22 may be made by controlling the operation of its associated hydraulic mechanism.

Referring particularly to FIGURE 5, a special type storage bin 52 is provided. The bin is substantially in the form of a box having separate angular sections to provide a tapered bottom. A bottom section 80 may be a door which may be opened by the operator in the tractor or by any other worker by movement of the latch element 81 to an unlocking position. Rectangular pieces of canvas or similar type pieces of cloth material 82 and 84 are suitably attached to the sides of the bin. Springs 86 and 88, or other resilient means, are attached to two corners of the piece of canvas 82. A similar pair of springs are attached to the piece of canvas 84, with only one spring 85 being illustrated in the drawing. The springs normally hold the two free corners of the pieces of canvas 82 and 84 in an upward position, as illustrated by the position of the piece of canvas 84.

When fruit is received from the chutes 54 and 56, it is dropped onto the pieces of canvas 82 and 84 where it is held for a time. When the weight of the received fruit on the pieces of canvas is sufficiently great, the corners of the canvas pieces 82 and 84 are caused to move downward against the tension of the springs. When this occurs, the fruit drops to one of the angular tapered sections of the bottom of the bin 52. The fruit may be stored in the bin 52 until loading time. At loading time, the bottom section 80 of the bin may be opened to permit the fruit to drop into a conveyor 58 and be carried to a loading platform or truck.

It is noted that the canvas pieces 82 and 84 are normally held in an upward position. The fruit received from the chutes 54 and 56 will therefore not drop any substantial distance. When the fruit starts to fall from the canvas members 84 and 86, it is dropped to the angular tapered sections of the bin only a relatively short distance.

It is seen that the present invention has provided a relatively simple machine including numerous features designed at minimizing the amount of damage to fruit from the time it is picked until the time of loading. The machine involves minimum expense since it is easily attachable to a conventional tractor and permits more than one picker to work from a single boom.

Various modifications of the harvesting machine involving the present invention may be made without departing from the scope of the invention. For example, the booms employed may be of various types and may be driven by means other than those shown. Various different types and sizes of conveyor systems may be employed and is dependent to some extent upon the type and size of the crop to be picked. Other features may be included in combination with the present invention, dependent upon the amount of expense and complexity which may be justified in a particular picking operation.

What is claimed is:

1. A harvesting machine for picking fruit from trees in an orchard comprising a plurality of booms, means for moving said booms to different angular, horizontal and vertical positions, a pair of substantially semi-circular platforms at the end of each of said booms for carrying workers adjacent the trees in said orchard, means for maintaining said platforms in a relatively level position for different vertical heights, means for mechanically adjusting said pair of platforms to different horizontal angles with respect to said boom, a pan disposed between each said pair of platforms for receiving fruit picked by said workers, a movable conveyor belt for carrying said picked fruit away from each said pan, a storage bin for storing fruit, a chute for transporting said fruit from said conveyors to said storage bin, and a conveyor for carrying away the fruit from said storage bin.

2. A harvesting machine for picking fruit from trees in an orchard comprising a plurality of booms driven by hydraulic mechanisms, means for operating said hydraulic mechanisms to move said booms to different angular, horizontal and vertical positions, a pair of substantially semi-circular platforms connected to a structural member at the end of each of said booms for carrying workers adjacent the trees in said orchard, a cable connected to said structural member for maintaining said platforms in a relatively level position for different vertical heights, a gearing mechanism operative by workers in said platforms for mechanically adjusting each said pair of platforms to different horizontal angles with respect to said booms, a pan disposed adjacent each said pair of platforms for receiving fruit picked by said workers, a movable conveyor belt for carrying said picked fruit away from each said pan, a storage bin for storing fruit, and a chute for transporting said fruit from said conveyor to said storage bin.

3. A harvesting machine for picking fruit from trees in an orchard comprising a plurality of booms driven by hydraulic mechanisms, said hydraulic mechanisms adapted to be operative to move said boom to different angular, horizontal and vertical positions, a pair of substantially semi-circular platforms connected to said structural member at the end of each of said booms for carrying workers adjacent the trees in said orchard, a cable connected to said structural member for maintaining said platforms in a relatively level position for different vertical heights, a gearing mechanism operative by workers in said platforms for mechanically adjusting each said pair of platforms to different horizontal angles with respect to said booms, a pan disposed between each said pair of platforms for receiving fruit picked by said workers, a movable conveyor belt for carrying said picked fruit away from each said pan, a storage bin, said storage bin including a box type container having a tapered bottom and a canvas type member attached thereo, a chute for transporting said fruit from said conveyor to said storage bin, and said chute being disposed to deposit said fruit on said canvas member prior to dropping to the tapered bottom of said storage bin.

4. A harvesting machine as set forth in claim 3 wherein said canvas type member comprises a rectangular piece of material having two corners resiliently attached to said storage bin.

References Cited in the file of this patent
UNITED STATES PATENTS

| | | |
|---|---|---|
| 2,450,152 | Miller | Sept. 28, 1948 |
| 2,606,078 | Brock | Aug. 5, 1952 |
| 2,674,500 | Hukari | Apr. 6, 1954 |
| 2,724,620 | Johnson et al. | Nov. 22, 1955 |
| 2,798,623 | Girardi | July 9, 1957 |
| 2,821,312 | Wiegel | Jan. 28, 1958 |
| 2,915,137 | Troche | Dec. 1, 1959 |